No. 681,501. Patented Aug. 27, 1901.
O. GAMAS.
TIRE SETTER.
(Application filed Dec. 1, 1900.)
(No Model.)
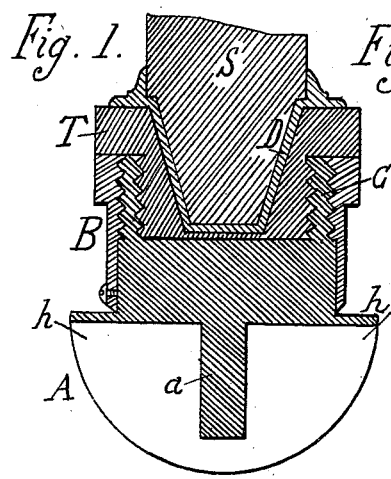
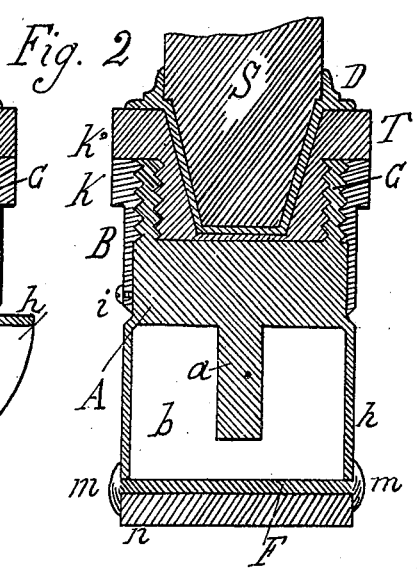
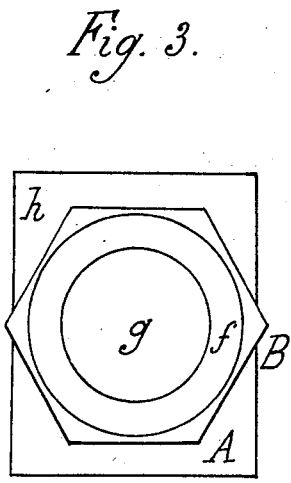
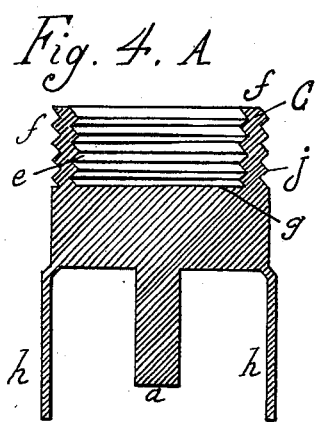
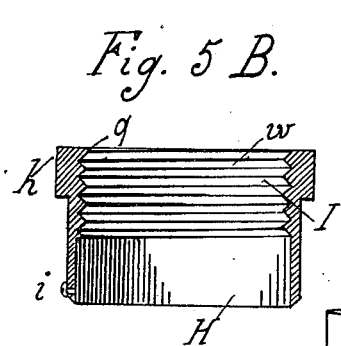
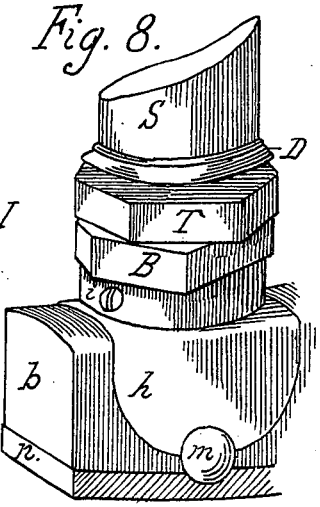
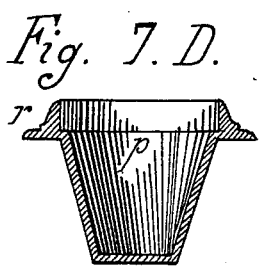
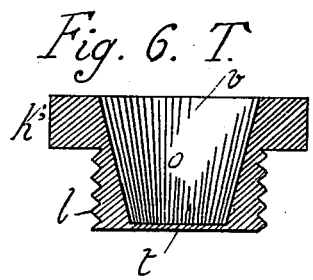
WITNESSES:
INVENTOR.
Octave Gamas
BY
Amos H. Carpenter
ATTORNEY.
THE NORRIS PETERS CO., PHOTO-LITHO., WASHINGTON, D. C.

UNITED STATES PATENT OFFICE.

OCTAVE GAMAS, OF WALLACE, CALIFORNIA.

TIRE-SETTER.

SPECIFICATION forming part of Letters Patent No. 681,501, dated August 27, 1901.

Application filed December 1, 1900. Serial No. 38,345. (No model.)

*To all whom it may concern:*

Be it known that I, OCTAVE GAMAS, a citizen of the United States, residing at Wallace, in the county of Calaveras and State of California, have invented a new and useful Improvement in Tire-Setters; and I declare that the following is a full, clear, and exact description of the invention, which will enable others skilled in the art to which it appertains to make and use the same, reference being had to the accompanying drawings, and to the letters of reference marked thereon, which form a part of this specification.

My invention relates to certain improvements in setting tires upon wheels of vehicles and keeping the same firm and rigid in all kinds of weather.

My object is to furnish a wheel with felly and spoke attachments, such as are hereinafter described, by means of which the tires thereof may be "set" and the rigidness of the wheel regulated by rotating a spoke-holder, and without requiring the tires to be heated and put on hot, as is now the custom. This I accomplish by the use of the peculiar construction, novel combination, and adaptation of parts hereinafter described, and particularly pointed out in the claims hereunto annexed, reference being had to the accompanying drawings for a better comprehension thereof, in which—

Figure 1 is a longitudinal section of my invention, showing the outer end of the spoke and the flap embracing the side of the felly. Fig. 2 is a transverse section of the same, showing the outer end of the spoke, cross-section of the felly and tire, and longitudinal section of the tire-rivet. Fig. 3 is a view of the inner end of the invention with the spoke-cap removed. Fig. 4 is a sectional view of the felly-plate. Fig. 5 is a sectional view of the set-nut. Fig. 6 is a sectional view of the spoke-holder. Fig. 7 is a sectional view of the spoke-cap. Fig. 8 is a perspective view of my invention attached to a spoke and felly of an ordinary wheel.

Similar letters of reference indicate corresponding parts in the several views.

My improvement consists, essentially, of the cylindrical felly-plate A, which may be made of any suitable metal, the body of which is solid, and from the outer end engaging the felly there are two projecting wings or flaps $h$, which closely embrace the sides of the felly $b$, and between which flaps is a tenon or dowel-pin $a$, protruding from the central point of the outer end of the body of said felly-plate and adapted to penetrate and fit closely in a corresponding tenon-hole on the inner side of the felly, and when so engaged the body of said felly-plate rests firmly and rigidly upon the inner side of the felly. The inner or hub end C of the felly-plate A is hollow, and the inside space thereof is cylindrical, extending longitudinally into the body of the felly-plate as far as may be convenient for the purpose, and spiral screw-threads $e$ are cut upon the inside of said cylindrical end, which are adapted to engage and work in the spiral screw-threads $l$ upon the outside of the spoke-holder T. Upon the hub end C of said cylindrical felly-plate A and on the outside thereof are likewise cut spiral screw-threads $j$, which are adapted to engage and work in spiral screw-threads $q$, cut upon the inside of the set-nut B, the outside threads of said felly-plate being designed to operate in a different direction from those on the inside, the latter being designed and cut to screw to the right and the outside to the left.

The spoke-holder T may be made of any suitable metal and is likewise cylindrical in shape, with spiral screw-threads cut upon the outer or felly end thereof, adapted to engage and work in the inside screw-threads $e$ of the felly-plate A, and upon the hub end $v$ of said spoke-holder is constructed a square, hexagonal, or other polygonal head $k'$, projecting outward to a convenient distance beyond the felly-plate A, so that the same may be turned either way by a wrench or other suitable instrument adapted to fit the same. The inside of said spoke-holder is so constructed as to form a circular socket $o$ and to be of a substantial U shape in its central cross-section and is adapted to receive the smaller and outer end of the spoke-cap D, which is designed to turn freely therein. The spoke-cap D is so constructed as to form a circular hood or cap covering and tightly fitting the outer end of the spoke and is substantially U-shaped in its central cross-section in its inner and outer appearance and formation, and upon the periphery of the larger or hub end there is constructed a projecting flange or shoulder r, extending entirely around the spoke-cap and designed to rest upon the hub end v of the spoke-holder T and to keep the dust and water from penetrating the mechanism. The inside U-shaped socket p is designed to receive and hold firmly the outer end of a spoke and protect the same from being worn or injured by setting the tire or regulating the wheel, as herein described.

The set-nut B is a hollow metallic cylinder with a square, hexagonal, or other polygonal head k constructed upon the inner or hub end w thereof and projecting outward as far as the head k' on the spoke-holder T, so that the same may be turned either way by a wrench or other suitable instrument adapted to fit the same. The inside surface of the felly end H of said cylindrical set-nut is smooth and adapted to turn upon and closely embrace the solid portion of the body of the felly-plate A, while the inside surface of the hub end I of said set-nut is corrugated with spiral screw-threads q, adapted to engage and work in the outside spiral threads j of the felly-plate A. In the outer or felly end H of the set-nut B is a small hole corrugated with spiral screw-threads and adapted to receive and hold a small safety-pin or set-screw i, which is designed to be screwed tightly therein against the unthreaded body of the felly-plate A and hold the set-nut in place by the friction and force of pressure thereof. At a point in the felly directly over the dowel-pin a a hole is bored crosswise of the felly, close to its periphery, and a metal rod F is inserted therein, with a nut or rivet-head m upon each end, which projects slightly over the flaps h of the felly-plate A and the tire n and when driven tightly thereon keeps said parts firmly in place. The outer or felly end of the spoke is tapering and made to fit snugly in the hollow U-shaped spoke-cap D.

It will be readily seen that when the spoke S, covered with the spoke-cap D, is placed in the spoke-holder T, embraced by the felly-plate A, and held and adjusted by means of the spiral screw-threads e and l, as shown in Fig. 1, and forming a portion of a wheel, as in Fig. 8, the distance between the hub and the felly may be increased or diminished, as desired, by turning the spoke-holder T in the proper direction, and when the spoke-holder of each spoke in the wheel is turned outward from the felly-plate at the proper distance the wheel becomes rigid and firm and the tire may be said to be set. If desired, the tension of the wheel may be lessened by turning the spoke-holder of each spoke in the opposite direction. When the wheel is properly adjusted and the desired firmness attained by turning the spoke-holders, the set-nut B is turned outward on the felly-plate, so that its head presses firmly against the head of the spoke-holder T, thereby keeping all the parts rigidly in place and free from dust and water, and the set-nut is itself kept in position by screwing the safety-pin i against the body of the felly-plate.

The advantages of my improvement are the ease and facility with which the tire of a wheel may be set and the wheel kept firm and rigid, and this setting or adjustment is accomplished by turning the spoke-holder of each spoke in the wheel without removing the wheel from the vehicle or the tire from the wheel. I am well aware that spoke-sockets with wings or flaps have been heretofore used, and therefore I do not make broad claims therefor.

What I claim, and desire to secure by Letters Patent, is—

1. The combination, in a tire-setter, of a cylindrical felly-plate having a tenon projecting from the central point of its outer end, and its inner end terminating in a hollow cylinder with spiral screw-threads upon the inside surface thereof adapted to engage and work in the outside screw-threads of the spoke-holder, with a cylindrical spoke-holder having a square or polygonal head and spiral screw-threads upon its exterior surface adapted to engage and work in the inside screw-threads of the felly-plate and an inside circular U-shaped socket, all substantially as set forth.

2. The combination, in a tire-setter, of a cylindrical felly-plate having a tenon projecting from the central point of its outer end, and its inner end terminating in a hollow cylinder with spiral screw-threads upon the inside and outside surface thereof, its inside threads being adapted to engage and work in the outside threads of the spoke-holder and its outside screw-threads being adapted to engage and work in the inside threads of the set-nut, with a cylindrical spoke-holder having a square or polygonal head and spiral screw-threads upon its exterior surface adapted to engage and work in the inside screw-threads of the felly-plate and an inside circular U-shaped socket, with a hollow circular spoke-cap having its exterior and interior surface U-shaped and a projecting shoulder or flange on its inner end, with a hollow cylindrical set-nut having spiral screw-threads at its spoke end, on its inside surface adapted to engage and work in the outside screw-threads of the felly-plate and a square or polygonal head at the same end on its outside surface, all substantially as set forth.

3. The combination, in a tire-setter, of the felly-plate A provided with tenon a, hollow cylindrical end C, inside spiral threads e, outside spiral threads j, embracing flaps h, of the spoke-holder T provided with spiral threads l, socket o and head k', of the spoke-cap D provided with shoulder r, socket p, of the set-nut B provided with inner spiral threads q, head k, opening and set screw i, of the rod F provided with rivet-heads m, all arranged and operating substantially as shown and described and for the purposes set forth.

4. The combination, in a tire-setter, of the felly-plate A, the spoke-holder T, the spoke-cap D, the set-nut B, the rod F with rivet-heads m, all arranged and operating substantially as shown and described and for the purposes set forth.

In testimony whereof I have signed my name to this specification in presence of two subscribing witnesses.

OCTAVE GAMAS.

Witnesses:
CHAS. N. FESSIER,
N. S. MISENER.